United States Patent
Lloyd

(10) Patent No.: US 11,881,594 B2
(45) Date of Patent: Jan. 23, 2024

(54) BATTERY PACK

(71) Applicant: Techtest Limited, Hereford (GB)

(72) Inventor: Jordan Edward Lloyd, Hereford (GB)

(73) Assignee: Techtest Limited, Hereford (GB)

( * ) Notice: Subject to any disclaimer, the term of this patent is extended or adjusted under 35 U.S.C. 154(b) by 579 days.

(21) Appl. No.: 16/835,943

(22) Filed: Mar. 31, 2020

(65) Prior Publication Data
US 2020/0328389 A1 Oct. 15, 2020

(30) Foreign Application Priority Data

Apr. 11, 2019 (GB) ...................................... 1905137

(51) Int. Cl.
*H01M 50/30* (2021.01)
*H01M 10/42* (2006.01)
(Continued)

(52) U.S. Cl.
CPC ....... *H01M 50/394* (2021.01); *H01M 10/425* (2013.01); *H01M 50/204* (2021.01); *H01M 50/213* (2021.01); *H01M 50/22* (2021.01); *H01M 50/233* (2021.01); *H01M 50/247* (2021.01); *H01M 50/276* (2021.01); *H01M 50/282* (2021.01); *H01M 50/284* (2021.01); *H01M 50/289* (2021.01);
(Continued)

(58) Field of Classification Search
CPC .................................................. H01M 50/213
See application file for complete search history.

(56) References Cited

U.S. PATENT DOCUMENTS

2011/0135975 A1* 6/2011 Fuhr ................... H01M 50/249
429/88
2014/0377622 A1* 12/2014 Glauning ............ H01M 50/247
429/120
(Continued)

FOREIGN PATENT DOCUMENTS

| CN | 107403893 A | 11/2017 |
|---|---|---|
| EP | 3297060 A1 | 3/2018 |
| WO | 2017/014470 A1 | 1/2017 |

OTHER PUBLICATIONS

GB1905137.4 received a Combined Search and Examination Report dated Oct. 1, 2019, 7 pages.

*Primary Examiner* — Nathanael T Zemui
(74) *Attorney, Agent, or Firm* — FisherBroyles, LLP

(57) ABSTRACT

A battery pack for powering an electrical device, comprising: a housing for a plurality of electrochemical cells, each having an elongate body with terminals at either end thereof; and electrical circuitry for coupling in series or parallel the plurality of electrochemical cells in the housing to electrical contacts of the electrical device; wherein the housing comprises: a first part having a body defining a chamber with an opening, the body being configured to retain the plurality of electrochemical cells side by side in the chamber, with one terminal of each cell facing towards the opening; and a second part comprising a filter and at least one vent, with the second part being configured to cover the opening of the chamber when coupled to the first part such that any combustion gases generated in the chamber by electrochemical cell malfunction pass through the opening and the filter before being vented externally of the housing through the at least one vent.

12 Claims, 4 Drawing Sheets

(51) Int. Cl.
*H01M 50/213* (2021.01)
*H01M 50/22* (2021.01)
*H01M 50/233* (2021.01)
*H01M 50/247* (2021.01)
*H01M 50/282* (2021.01)
*H01M 50/276* (2021.01)
*H01M 50/293* (2021.01)
*H01M 50/291* (2021.01)
*H01M 50/342* (2021.01)
*H01M 50/367* (2021.01)
*H01M 50/383* (2021.01)
*H01M 50/284* (2021.01)
*H01M 50/289* (2021.01)
*H01M 50/204* (2021.01)

(52) U.S. Cl.
CPC ....... *H01M 50/291* (2021.01); *H01M 50/293* (2021.01); *H01M 50/3425* (2021.01); *H01M 50/367* (2021.01); *H01M 50/383* (2021.01); *H01M 2200/10* (2013.01); *H01M 2220/30* (2013.01); *Y02E 60/10* (2013.01)

(56) References Cited

U.S. PATENT DOCUMENTS

2019/0252652 A1* 8/2019 Guillemard ......... H01M 50/213
2021/0083255 A1* 3/2021 Demont .............. H01M 10/486
2021/0367307 A1* 11/2021 Raettich ................ H01M 50/20

* cited by examiner

BATTERY PACK

CROSS-REFERENCE TO RELATED APPLICATIONS

This application claims priority to GB Patent Application No. 1905137.4, filed Apr. 11, 2019, the disclosure of which is incorporated by reference herein in its entirety.

DESCRIPTION

Technical Field

The present invention relates to a battery pack for powering an electrical device.

Technical Background

RTCA DO-227A is a standard created to establish a Minimum Operational Performance Standard (MOPS) for non-rechargeable lithium batteries which are to be installed on aircraft. Typical battery uses and applications include, but are not limited to, batteries used to power Personal Locator Beacons (PLBs) and Emergency Locator Transmitters (ELTs). The MOPS contains a set of requirements, tests and evaluation criteria to establish and ensure the safe operation of equipment powered by non-rechargeable lithium batteries.

The aim of the present invention is to provide a battery pack which meets the requirements of RTCA DO-227A, and which is designed to reduce or eliminate damage to the electrical device and surrounding peripherals, such as the aircraft itself, caused by a spontaneous thermal runaway event by an electrochemical cell within the battery pack. Such a thermal event occurs when a malfunctioning electrochemical cell overheats and possibly explodes. The battery pack may be applicable to rechargeable lithium batteries as well as non-rechargeable lithium batteries, and even other battery types such as nickel cadmium batteries.

EP3297060 discloses a high-energy battery pack device which includes at least two electrochemical cells connected in series or parallel through a circuit board. Each electrochemical cell is positioned in a respective casing structure mounted on the circuit board. In one arrangement, the electrochemical cells are partially enclosed by their respective casing structures, with each casing structure having an opening. The casing structures are mounted on the circuit board such that the respective openings face in different directions.

SUMMARY OF THE INVENTION

In accordance with one aspect of the present invention, there is provided a battery pack for powering an electrical device, comprising: a housing for a plurality of electrochemical cells, each having an elongate body with terminals at either end thereof; and electrical circuitry for coupling in series or parallel the plurality of electrochemical cells in the housing to electrical contacts of the electrical device; wherein the housing comprises: a first part having a body defining a chamber with an opening, the body being configured to retain the plurality of electrochemical cells side by side in the chamber, with one terminal of each cell facing towards the opening; and a second part comprising a filter and at least one vent, the second part being configured to cover the opening of the chamber when coupled to the first part such that any combustion gases generated in the chamber by electrochemical cell malfunction pass through the opening and the filter before being vented externally of the housing through the at least one vent.

The present applicant has found that the filter may help prevent flames and shrapnel from exiting the battery pack in a thermal runaway event leading to catastrophic failure of at least one electrochemical cell in the battery pack.

The filter may be a multilayer filter, and may comprise metal. For example, the filter may comprise a foraminous metal sheet or may comprise a metal gauze. The filter may further comprise a microporous material, which may be inert at high temperatures, i.e. temperatures in excess of 500° C., and possibly even 1000° C. The microporous material may comprise mineral fibres, and may comprise or consist of calcium magnesium silicate wool. The different layers of the multilayer filter may be mechanically clamped or chemically bonded together.

In use, the multilayer filter is configured to contain shrapnel generated during a thermal runaway event and catastrophic failure of at least one electrochemical cell in the battery pack. Furthermore, the multilayer filter is configured to absorb thermal energy from combustion gases passing therethrough, and may even act as a flame suppressor or arrestor by reducing temperature of the combustion gases below their ignition temperature before exiting through the at least one vent.

The at least one vent may be orientated to direct combustion gases away from first part. The at least one vent may include a seal configured to prevent ingress of water into the chamber (without preventing egress of combustion gasses from the chamber). The seal may be configured to rupture as pressure inside the chamber rises above ambient pressure, for example due to combustion gases formed during a thermal runaway event. The seal may also be configured to prevent ingress of foreign objects into the chamber. The seal may be re-sealable once pressure inside the chamber is reduced to substantially match ambient pressure.

The body of the first part may be configured to maintain a minimum spacing between adjacent electrochemical cells when retained side by side in the chamber. The minimum spacing may be at least 1 mm, possibly at least 1.5 mm, and may even be at least 2 mm. Such a minimum spacing helps to insulate adjacent electrochemical cells, and prevent a thermal runaway event in one electrochemical cell triggering a thermal runaway event in a neighbouring electrochemical cell. The body of the first part may be configured to act as a heat sink in the event of a thermal runaway event.

The body may include at least one internal wall, providing a physical barrier to maintain the minimum spacing between adjacent electrochemical cells when retained side by side in the chamber. The at least one wall may be disposed in between adjacent electrochemical cells when retained side by side in the chamber. The at least one internal wall may be configured to aid containment of a thermal runaway event to a single electrochemical cell, i.e. helping to prevent the malfunction spreading to neighbouring electrochemical cells. The at least one internal wall may comprise a material configured to absorb thermal energy during a thermal runaway event. In this way, the at least one internal wall may act as a heat sink during a thermal runaway event. For example, the at least one internal wall may comprise a material configured to undergo an endothermic chemical transformation.

The at least one internal wall may also define at least one cavity. The at least one cavity may occupy at least 10% of the total volume of the chamber. The presence of at least one cavity increases the internal volume of the chamber and may help minimise pressure build up in the battery pack during a thermal runaway event. The at least one cavity may also improve performance of the at least one wall as a heat sink by increasing surface area and thereby improving thermal dissipation.

The at least one wall may include at least one channel associated with the at least one cavity and configured to direct gases, flames and/or shrapnel generated during a thermal runaway event towards the at least one cavity. The at least one channel may also be configured to promote turbulent flow of gases within the chamber to suppress flames during a thermal runaway event.

The electrical circuitry may be configured such that when the plurality of electrochemical cells are retained side by side in the chamber, the terminals of the electrochemical cells facing towards the opening have the same polarity. For example, the electrical circuitry may be configured such that when the plurality of electrochemical cells are retained side by side in the chamber, the positive terminals of the electrochemical cells face towards the opening. The present applicant has found that certain electrochemical cell types consistently erupt from the same end during a thermal runaway event. For example, extensive testing revealed that an AA Energizer L91 lithium/iron disulphide cell consistently reacted through the positive terminal end of the electrochemical cell during a thermal runaway event, regardless of orientation. It is believed that other cell types may show similar consistencies, though possibly from the negative terminal end rather than the positive terminal end. Thus, a thermal runaway event may be managed more effectively by configuring the electrical circuitry so that the electrochemical cells are aligned with the same polarity of terminal facing the opening (so that any eruption is more likely directed towards the second part of the housing when covering the opening).

BRIEF DESCRIPTION OF THE DRAWINGS

An embodiment of the invention will now be described by way of example and with reference to the accompanying figures.

DESCRIPTION OF SPECIFIC EMBODIMENT

Figure 1:
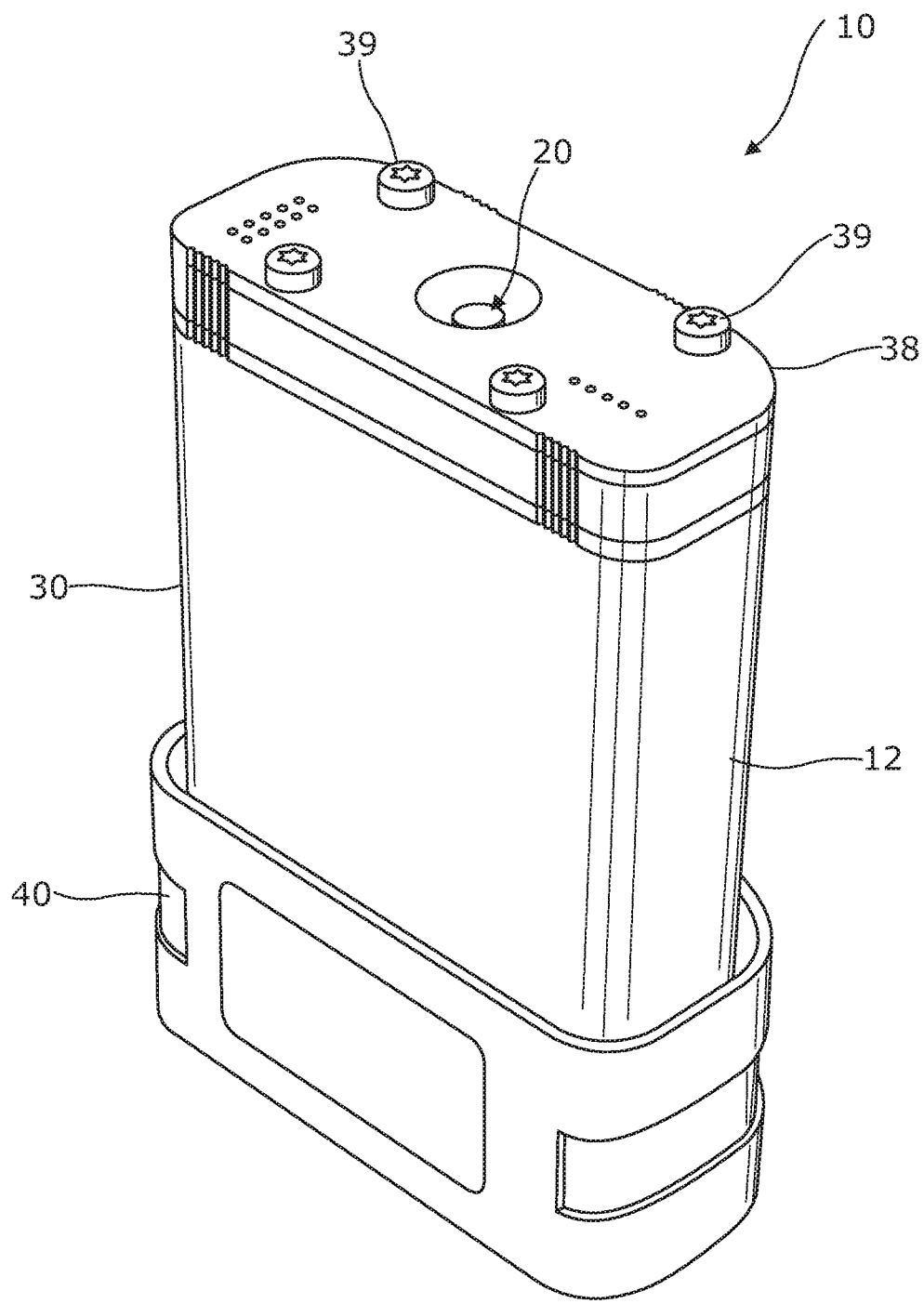
FIG. 1 is a schematic perspective view of a battery pack, according to one embodiment of the present invention.

FIG. 1 illustrates schematically one embodiment of a battery pack 10 for powering an electrical device such as a PLB or an ELT (not shown). The battery pack 10 comprises a housing 12 for four electrochemical cells 14, and electrical circuitry 20 for coupling the electrochemical cells 14 in series or parallel to electrical contacts of the electrical device. The housing 12 comprises a first part 30 and a second part 40 configured to be releasably coupled to the first part 30 in use. The first part 30 has a body 32 defining a chamber 34 with an opening 36. The body 32 is configured to retain the electrochemical cells 14 side by side in the chamber 34. The second part 40 covers the opening 36 when coupled with screws (not shown) to the first part 30, and comprises a filter 42 and at least one vent 44. In the event of a thermal runaway event, combustion gases generated in the chamber 34 are vented externally of the housing 12 through the at least one vent 44 via the opening 36 and the filter 42.

Figure 2:
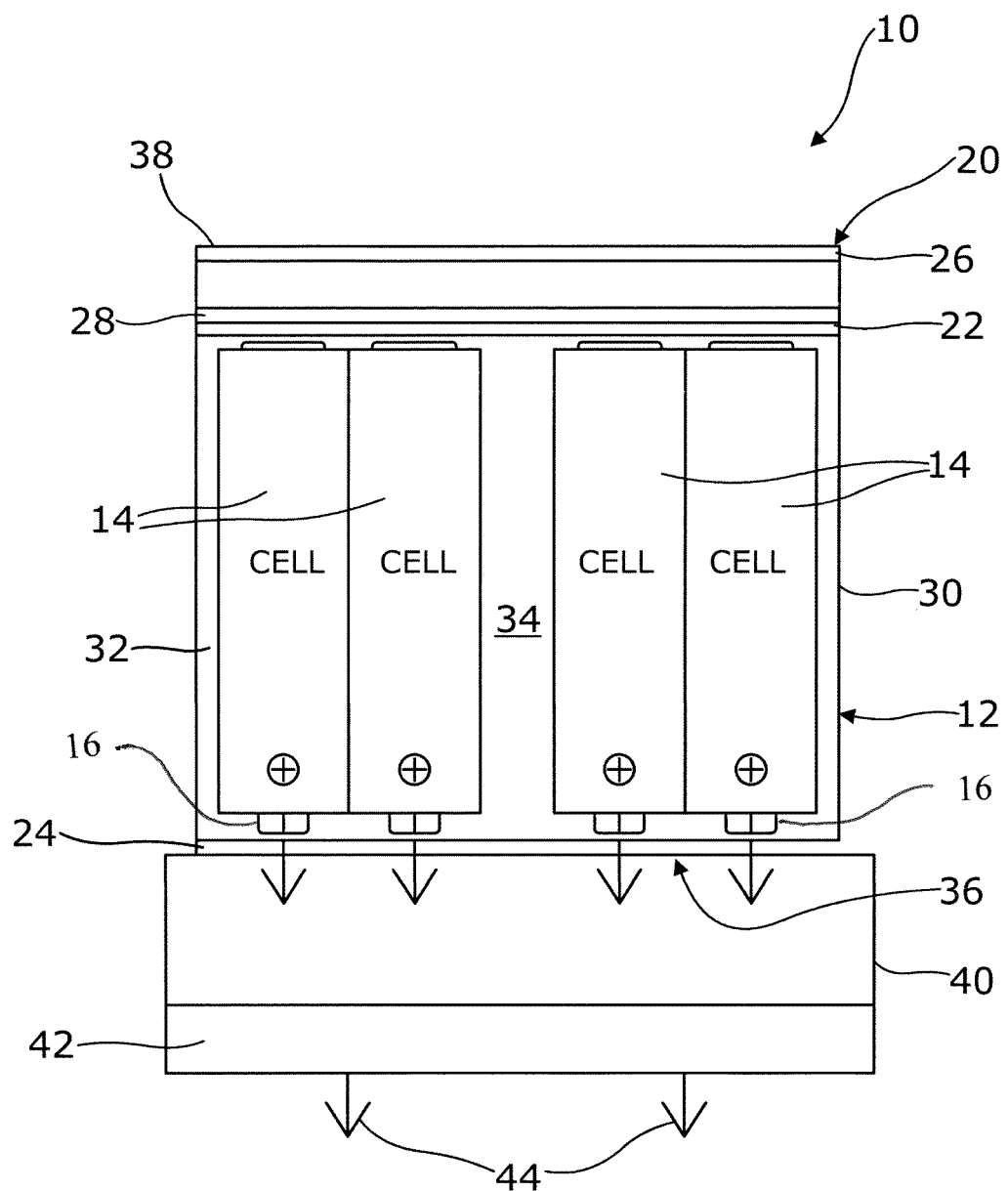
FIG. 2 is a schematic vertical cross-sectional view of the battery pack of FIG. 1.
Figure 3:
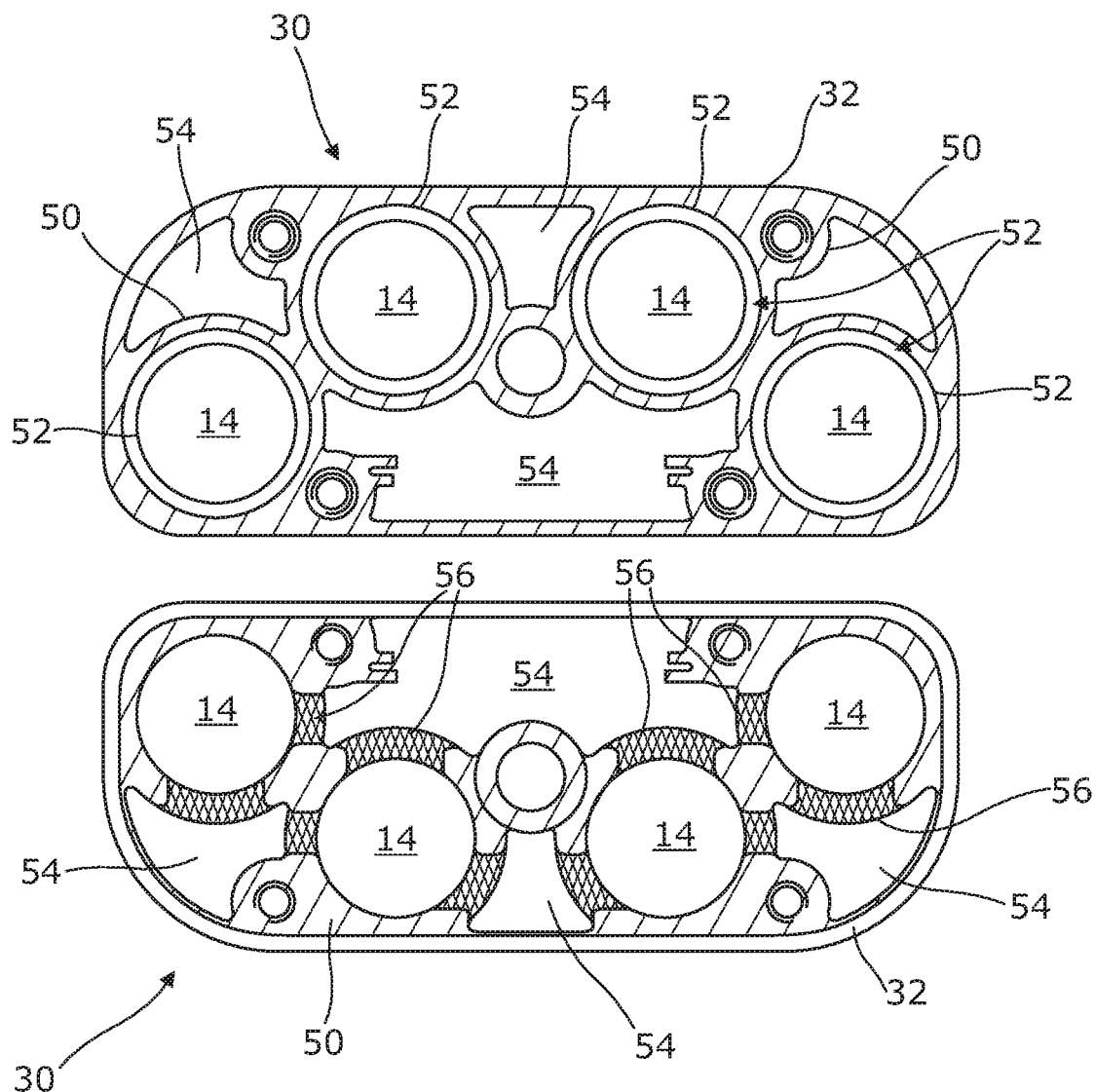
FIG. 3 is a schematic horizontal cross-sectional view through a first part of the battery pack of FIG. 1.

FIGS. 2 and 3 illustrate internal detail of the battery pack 10. Although the battery pack 10 only has four electrochemical cells 14, other battery packs may be provided in accordance with the present invention with more or fewer electrochemical cells. Each electrochemical cell 14 has an elongate body with terminals at either end thereof, and in this example is a non-rechargeable lithium battery. The electrochemical cells 14 are all aligned in the chamber with their positive terminals 16 facing towards the opening 36 and the second part 40. The first part 30 includes a lid 38 at one end of the chamber 34, opposite to the opening 36. The electrochemical cells 14 are inserted into the chamber 34 (and subsequently removed therefrom) by removing the lid 38. In use, the lid 38 is secured to the body 32 with screws 39.

The electrical circuitry 20 includes top and bottom printed circuit boards 22, 24 at either end of the electrochemical cells 14, and an interface 26 for coupling to electrical contacts of the electrical device. The bottom printed circuit 24 has a low profile, and may include holes, voids or cut-outs to minimise interference with any material such as gas or shrapnel ejected from an electrochemical cell 14 experiencing a thermal runaway event. In contrast, top circuit board 22 is designed to be impervious to hinder upward movement (i.e. towards interface 26) of any material ejected from an electrochemical cell 14 experiencing a thermal runaway event. A gasket 28 is disposed between top circuit board 22 and the lid 38 of the first part 30 to resist any pressure build up inside chamber 34, and prevent gases escaping through an undesired route, e.g. through an opening in the first part 30 associated with the interface 26. The gasket 28 may be manufactured from a high temperature gasket material such as carbon fibre reinforced nitrile rubber.

The body 32 of the first part 30 includes internal walls 50 in the chamber 34 which define set positions or individual compartments 52 for the electrochemical cells 14 and act as a physical barrier, maintaining a minimum spacing of at least 2 mm between electrochemical cells 14 in the chamber 34. The body 32 also defines a plurality of cavities 54 between internal walls 50, with channels 56 providing fluid communication between the compartments 52 and the cavities 54. The channels 56 provide a route to at least one of the plurality of cavities 54 for combustion gases, and even molten metal, generated during a thermal runaway event by a malfunctioning electrochemical cell 14 in one of the compartments 52.

Figure 4:
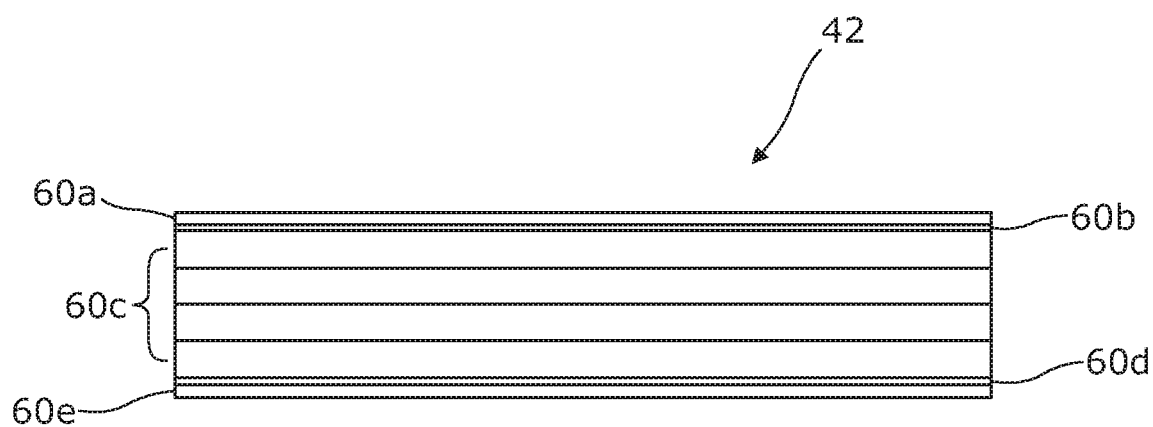
FIG. 4 is a schematic illustration showing sectional detail of a filter in a second part of the battery pack of FIG. 1.

FIG. 4 illustrates sectional detail of the filter 42 in the second part 40. The filter 42 is made up of multiple stacked layers such as 60a, 60b, 60c, 60d, 60e. Although five layers are illustrated, there may be more or fewer layers, depending on specific requirements of the battery pack 10. The filter may include foraminous metal sheet or metal gauze layer(s), such as 60a 60e, separated by layers 60b, 60c and 60d of a microporous material. For example, the foraminous metal sheet or metal gauze may comprise stainless steel, and the microporous material may comprise fibres of calcium magnesium silicate wool.

The invention claimed is:
1. A battery pack for powering an electrical device, comprising:
a housing configured to receive a plurality of electrochemical cells, each having an elongate body with terminals of opposite polarity at either end thereof; and electrical circuitry configured to couple in series or parallel the plurality of electrochemical cells in the housing to electrical contacts of the electrical device;

wherein the housing comprises:

a first part having a body defining a chamber with an opening, the body being configured to retain the plurality of electrochemical cells side by side in the chamber, with one terminal of each cell facing towards the opening, with an end of the chamber opposite the opening being configured to resist any pressure build up inside the chamber; and a second part comprising a filter and at least one vent, the filter being a multilayer filter comprising metal, with the second part being configured to cover the opening of the chamber when coupled to the first part such that any combustion gases generated in the chamber by electrochemical cell malfunction pass through the opening and the multilayer filter before being vented externally of the housing through the at least one vent, and with the multilayer filter being configured to: contain shrapnel generated by catastrophic failure of at least one of the plurality of electrochemical cells during a thermal runaway event; and absorb thermal energy from combustion gases passing therethrough to suppress flames exiting the at least one vent by reducing temperatures of combustion gases below their ignition temperature;

wherein the electrical circuitry is configured such that when the plurality of electrochemical cells are retained side by side in the chamber, the tenninals of all the plurality of electrochemical cells facing towards the opening have a common polarity.

2. A battery pack according to claim 1, wherein the multilayer filter comprises a foraminous metal sheet or a metal gauze.

3. A battery pack according to claim 1, wherein the multilayer filter comprises a microporous material comprising mineral fibres which are inert at temperatures of at least 500° C.

4. A battery pack according to claim 1, wherein the at least one vent includes a seal configured to prevent ingress of water into the chamber.

5. A battery pack according to claim 4, wherein the seal is configured to rupture if pressure inside the chamber rises above ambient pressure.

6. A battery pack according to claim 1, wherein the body of the first part is configured to maintain a minimum spacing between adjacent electrochemical cells when retained side by side in the chamber.

7. A battery pack according to claim 6, wherein the minimum spacing is at least 1 mm.

8. A battery pack according to claim 6, wherein the body includes at least one internal wall, providing a physical barrier to maintain the minimum spacing between adjacent electrochemical cells when retained side by side in the chamber.

9. A battery pack according to claim 8, wherein the at least one internal wall comprises a material configured to absorb thermal energy during a thermal runaway event.

10. A battery pack according to claim 8, in which the at least one internal wall defines at least one cavity.

11. A battery pack according to claim 10, wherein the at least one internal wall includes at least one channel configured to direct gases, flames and/or shrapnel generated during a thermal runaway event towards the at least one cavity.

12. A battery pack according to claim 1, wherein the electrical circuitry is configured such that when the plurality of electrochemical cells are retained side by side in the chamber, the terminals of the electrochemical cells facing towards the opening are positive terminals.

* * * * *